(12) United States Patent
Gunawardana

(10) Patent No.: US 7,003,740 B2
(45) Date of Patent: Feb. 21, 2006

(54) METHOD AND APPARATUS FOR MINIMIZING WEIGHTED NETWORKS WITH LINK AND NODE LABELS

(75) Inventor: Asela J. Gunawardana, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 10/620,996

(22) Filed: Jul. 16, 2003

(65) Prior Publication Data

US 2005/0015734 A1 Jan. 20, 2005

(51) Int. Cl.
*G06F 17/50* (2006.01)

(52) U.S. Cl. ........................................................ 716/2

(58) Field of Classification Search .................... 716/1, 716/2; 709/238–244; 704/243, 244, 247, 704/251, 256–257, 2, 4
See application file for complete search history.

(56) References Cited

U.S. PATENT DOCUMENTS 6,243,679 B1 * 6/2001 Mohri et al. ................. 704/256
2002/0091855 A1 * 7/2002 Yemini et al. ............... 709/238

OTHER PUBLICATIONS

Mohri, M., "On Some Applications of Finite-State Automata Theory to Natural Language Processing," Natural Language Engineering, vol. 2, pp. 61-80, 1996.
Mohri, M., "Minimization Algorithms for Sequential Transducers," Theoretical Computer Science, vol. 234, No. 1-2, pp. 177-201, 2000.

* cited by examiner

*Primary Examiner*—Vuthe Siek
(74) *Attorney, Agent, or Firm*—Theodore M. Magee; Westman, Champlin & Kelly, P.A.

(57) ABSTRACT

A method and apparatus are provided for optimizing finite state machines with labeled nodes. Under the method, labels from the nodes are shifted onto the labels of the links connected to the nodes. The finite state machine is then optimized. After optimization, the labels on the links are examined to verify that the prefixes of the labels on each outgoing link match the suffixes of the labels on each incoming link to a particular node. After this verification, a portion of a label on a link is removed from the link and inserted onto the node.

7 Claims, 7 Drawing Sheets

METHOD AND APPARATUS FOR MINIMIZING WEIGHTED NETWORKS WITH LINK AND NODE LABELS

BACKGROUND OF THE INVENTION

The present invention relates to finite state machines. In particular, the present invention relates to optimizing finite state machines.

Finite state machines are a general way of efficiently representing sets of strings, probability distributions on strings, mappings between strings, and joint and conditional distributions on pairs of strings. They are used in speech recognition for representing grammars, language models, dictionaries, search networks, and the search space during decoding. In natural language processing, they are used for parsing, morphological analysis, and tokenization.

Traditionally, finite state machines are directed networks composed of a set of nodes and a set of directed links between those nodes. One of the nodes is identified as an initial node and at least one, but possibly many other nodes are designated as valid final nodes. A valid pass through the finite state machine starts at the initial node, follows links through the network, and ends at a final valid node. Before reaching the final node, the path may pass through other final nodes. While it is legal to stop at a final node, a valid path does not have to stop simply because it reaches a final node.

Each link is labeled with symbols from an alphabet. For example, the links may be labeled with letters, phonemes, triphones, words, or some other abstract symbol. Thus, the finite state machine represents a set of strings, each of which is generated by some legal path through the finite state machine.

To determine if a given string is in the set of strings represented by the finite state machine, one starts at the initial node and follows all the links with labels that agree with the next symbol in the string, keeping track of the set of nodes that are passed through. This process continues until there is either no link from the current node that matches the next symbol, in which case the string does not parse, or until the string ends. If the string ends and the set of current nodes contain a final state, the string is represented by the finite state machine, and if not, the string is not represented by the finite state machine.

In some finite state machines, a cost or probability is placed on each link in addition to the label. Costs or probabilities are combined during the traversal of the path through the finite state machine to give the cost or probability of generating a string.

Finite state machines can either be finite state acceptors or finite state transducers. Finite state acceptors have input symbols on each link while finite state transducers have input and output symbols on each link. For example, a final link for a string that represents a word in a finite state transducer can have an input symbol for the last phoneme in the word and an output symbol representing the complete word.

One of the advantages of finite state machines is that they can be optimized to remove redundancies and thereby reduce the time and space required to use the finite state machines. One optimization process is known as determinization. Under determinization, an equivalent finite state machine is created such that there is at most one link with a given label leaving each node. This means that during parsing, there is only one current state at a time instead of a set of current states. Another optimization technique is known as minimization in which the finite state machine is reduced to produce the smallest number of states possible. The goal in minimization is to create a finite state machine with the fewest possible nodes and links for the set of strings represented by the finite state machine.

Classical optimization routines only consider labels on links. As such, it has not been possible to use classical routines to optimize finite state machines that include labels on nodes. This has meant that such finite state machines are either not optimized or that some special optimization routine must be written that tracks the node labels as well as the link labels. Thus, a system is needed that allows link-based optimization routines to be used with finite state machines that include node labels.

SUMMARY OF THE INVENTION

A method and apparatus are provided for optimizing finite state machines with labeled nodes. Under the method, labels from the nodes are shifted onto the labels of the links connected to the nodes. The finite state machine is then optimized. After optimization, the labels on the links are examined to verify that the prefixes of the labels on each outgoing link match the suffixes of the labels on each incoming link to a particular node. After this verification, a portion of a label on a link is removed from the link and inserted into the node.

DETAILED DESCRIPTION OF ILLUSTRATIVE EMBODIMENTS

Figure 1:
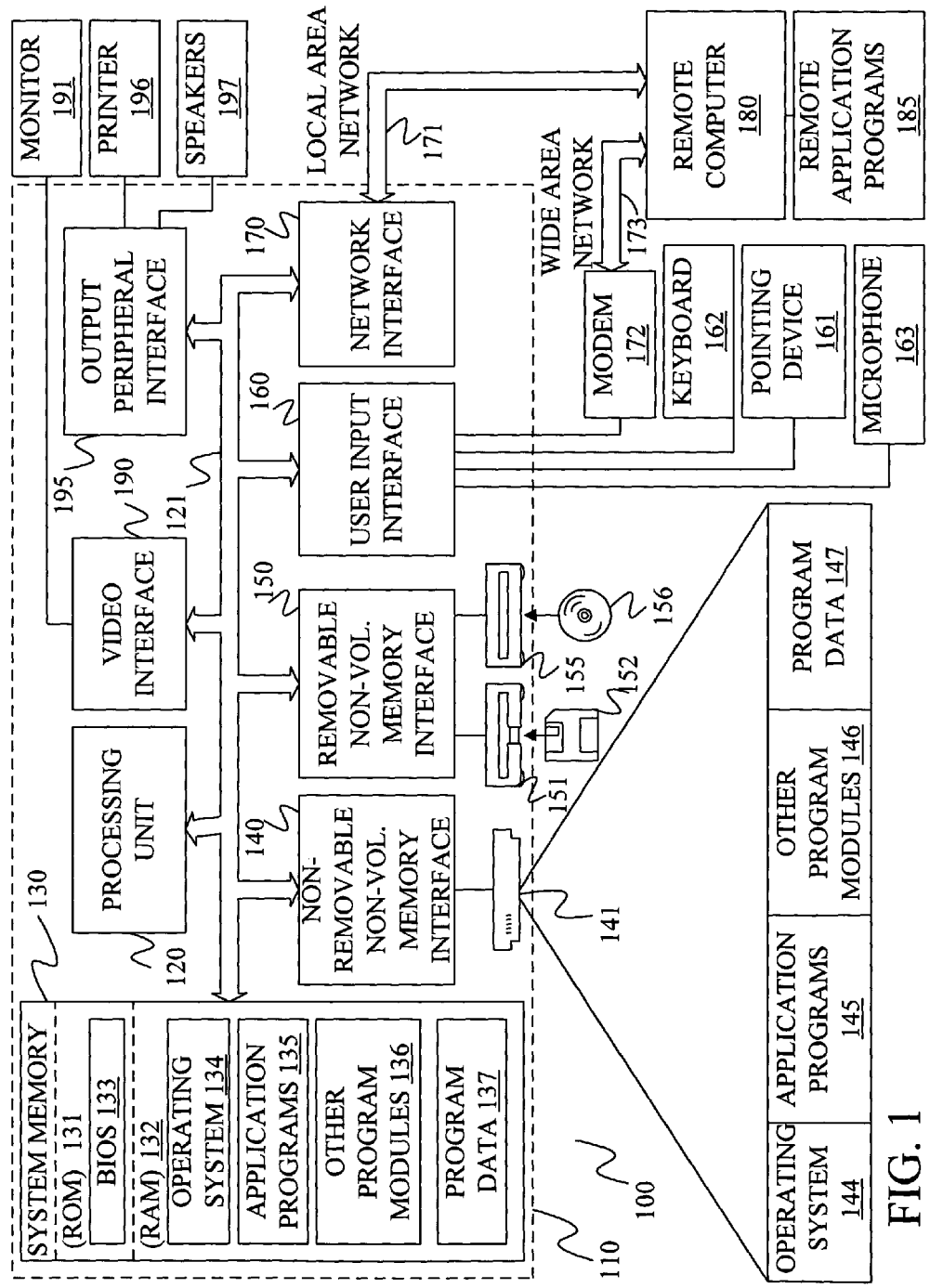
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
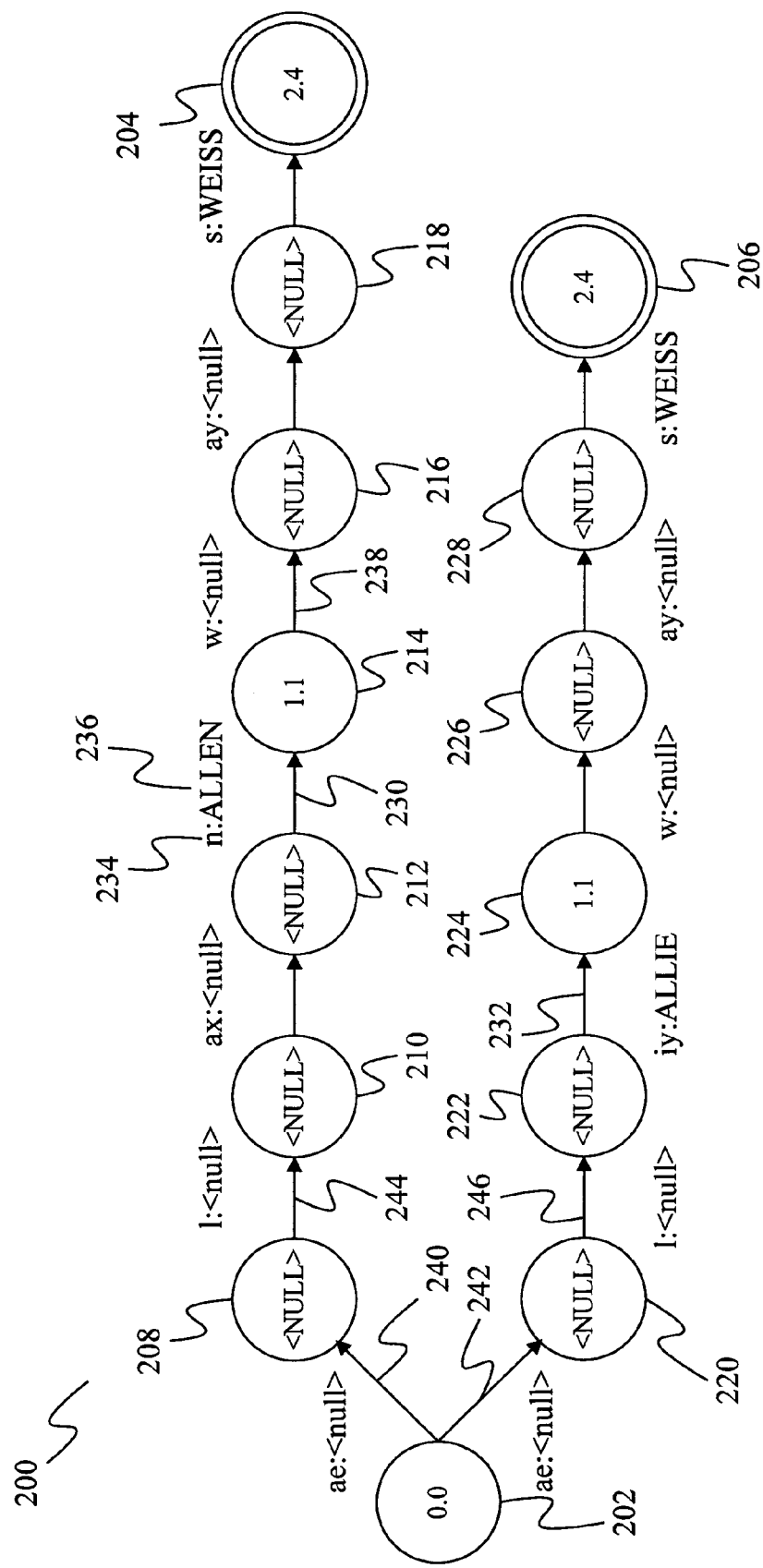
FIG. 2 is a diagram of a finite state machine with labeled nodes.

The present invention provides a means for optimizing finite state machines with labeled nodes such as finite state machine 200 of FIG. 2. Finite state machine 200 includes an initial node 202, two valid final nodes 204 and 206 and eleven invalid final nodes 208, 210, 212, 214, 216, 218, 220, 222, 224, 226, and 228. The nodes are connected by links such as link 230 between nodes 212 and 214 and link 232 between node 222 and node 224. In the embodiment of FIG. 2, the finite state machine 200 is a finite state transducer in which each link is associated with an input string symbol such as symbol 234 of link 230 and an output string symbol, such as symbol 236 of link 230. Thus, to traverse link 230, an input symbol "n" must be found in the input string to provide an output string symbol of "ALLEN". Although not shown, each link can also have an associated probability or score. With such probabilities, the finite state machine would become a weighted finite state transducer.

Links that lead into a node are referred to as incoming links and links that leave a node are referred to as outgoing links. For example, for node 214 there is incoming link 230 and outgoing links 238.

Nodes 214 and 224 share a label "1.1" and nodes 208, 210, 212, 216, 218, 220, 222, 226, and 228 share a label of "<null>". In some embodiments, such labels represent boundary times between speech units.

Figure 3:
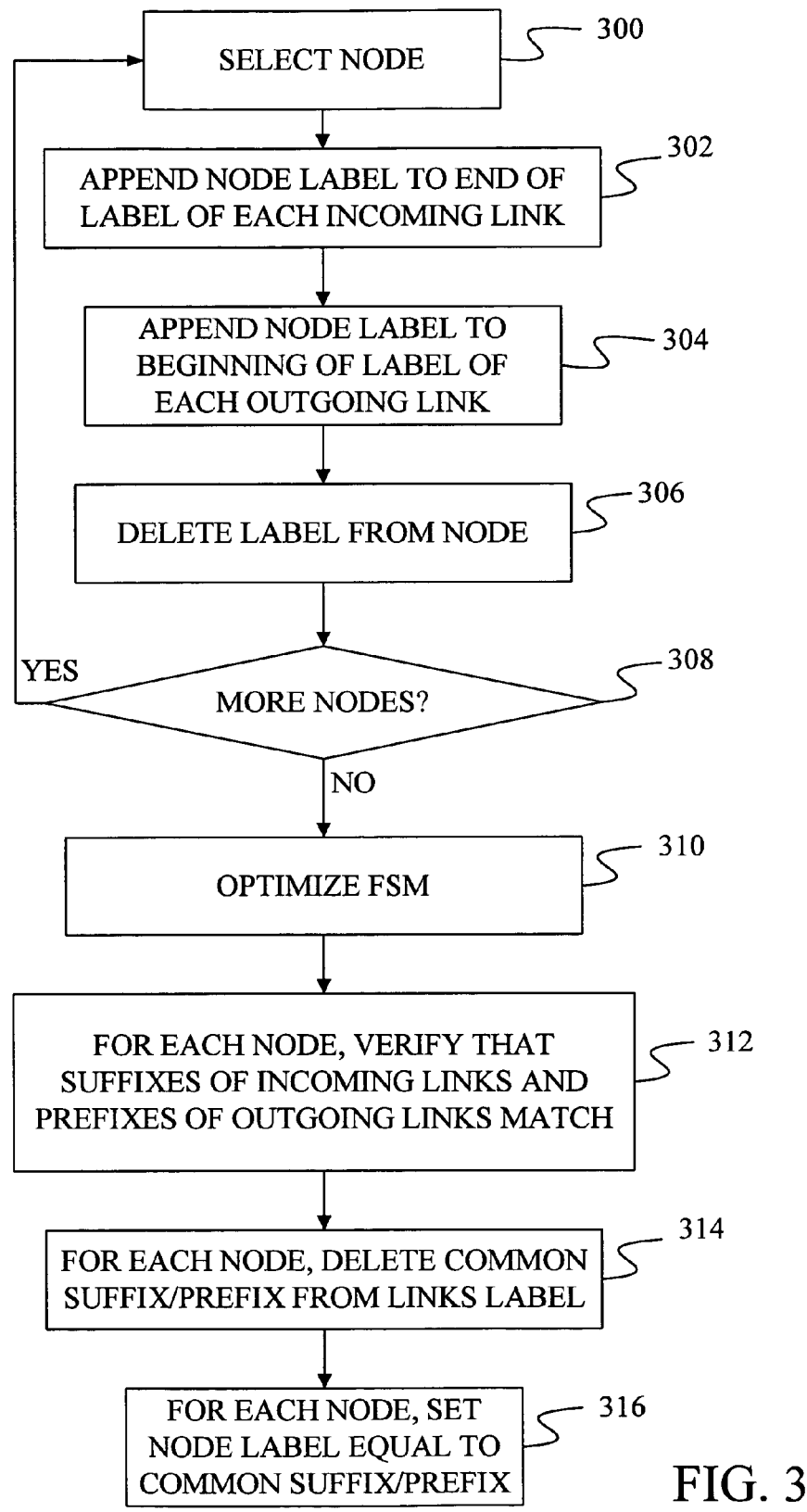
FIG. 3 is a flow diagram under the present invention for optimizing finite state machines with labeled nodes.

The method of FIG. 3 provides a means for optimizing finite state machines such as finite state machine 200 of FIG. 2. In particular, the method of FIG. 3 allows for determinization and minimization of the finite state machine.

At step 300, a node in the finite state machine is selected. At step 302, the node label from the selected node and a comma separator are appended to the end of each label of each incoming link to the node. For example, for node 214, the label "1.1" and a comma separator are appended to each incoming link label such as the label for link 230 to form modified link label "n:ALLEN, 1.1".

At step 304, the node label for the selected node is appended to the beginning of each link label for each outgoing link from the node. For example, for node 214, a node label "1.1" and a comma separator are appended to the link label for link 238 to form label "1.1, w:<null>".

At step 306, the label for the selected node is deleted from the node. After the label has been deleted from the selected node, the method determines if there are more nodes in the finite state machine at step 308. If there are more nodes, the next node is selected at step 300 and steps 302, 304 and 306 are repeated.

Figure 4:
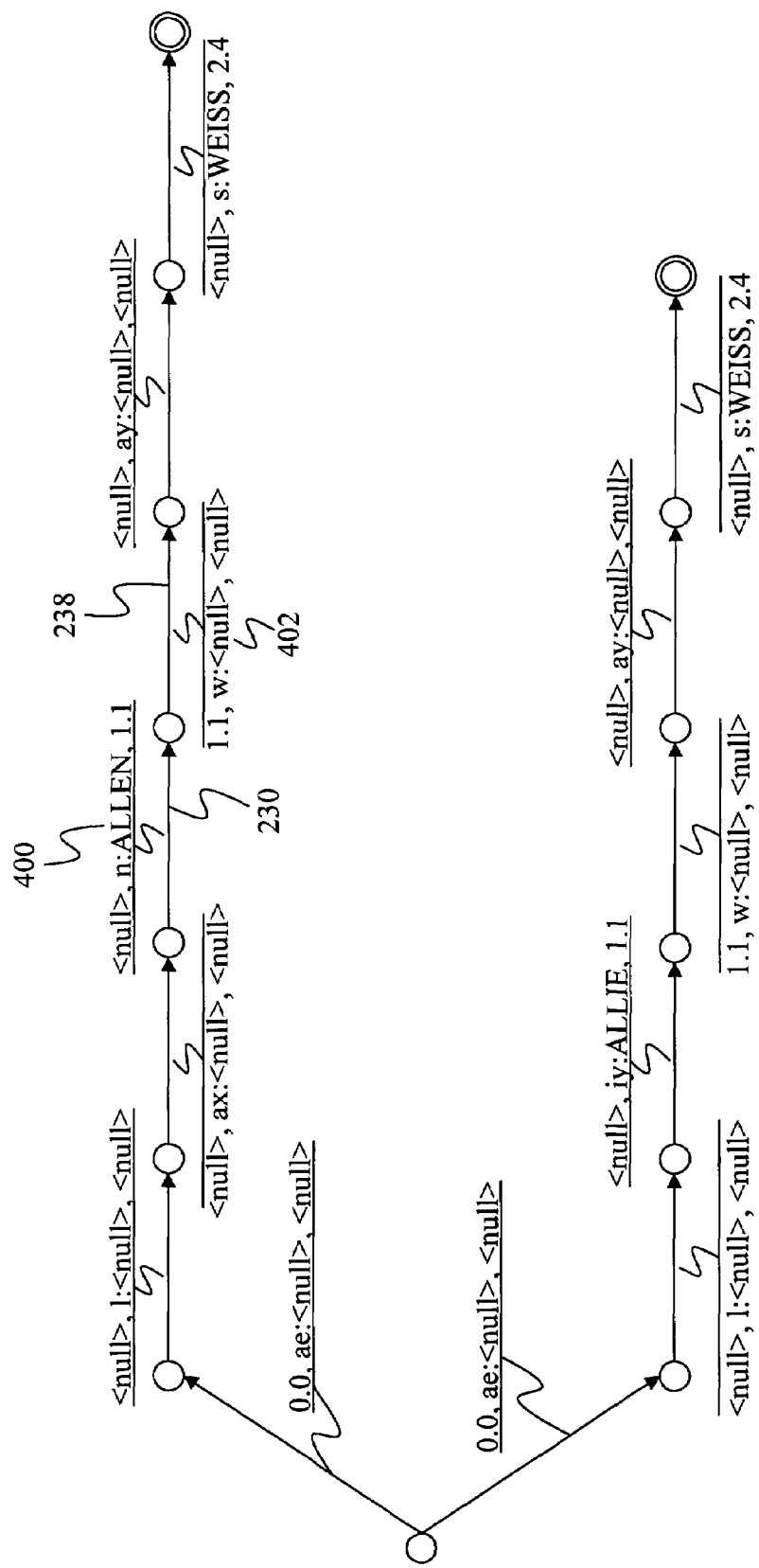
FIG. 4 is a diagram of a finite state machine after appending node labels to link labels.

When there are no more nodes at step 308, the finite state machine of FIG. 2 has been converted into the finite state machine of FIG. 4 in which there are no labels within in the nodes and the labels on the links between the nodes have been modified to include the label information of the nodes. For example, the label for link 230 has been modified by appending node label "<null>" and a comma separator to the beginning of the link label and appending node label "1.1" and a comma separator to the end of the link label to form label 400, which is "<null>, n:ALLEN, 1.1". Similarly, the label for link 238 has been modified by appending node label "1.1" to the beginning of the link label and node label "<null>" to the end of the link label to form label 402, which is "1.1, w:<null>, <null>".

After all the node labels have been shifted to the link labels at step 308, the finite state machine of FIG. 4 is optimized at step 310. This can involve a step of determinization and/or a step of minimization as well as other optimization steps. Such steps are well known in the art and can involve removing one or more nodes from the finite state machine as well as adding nodes and links to the finite state machine. During the optimization, the modified link labels of FIG. 4 are used in place of the original link labels and any requirements placed upon the labels by the optimization routine are placed on the modified labels. For example, if labels on two links must be identical in order to combine a node, it is the modified links that must be identical under the present invention.

Figure 5:
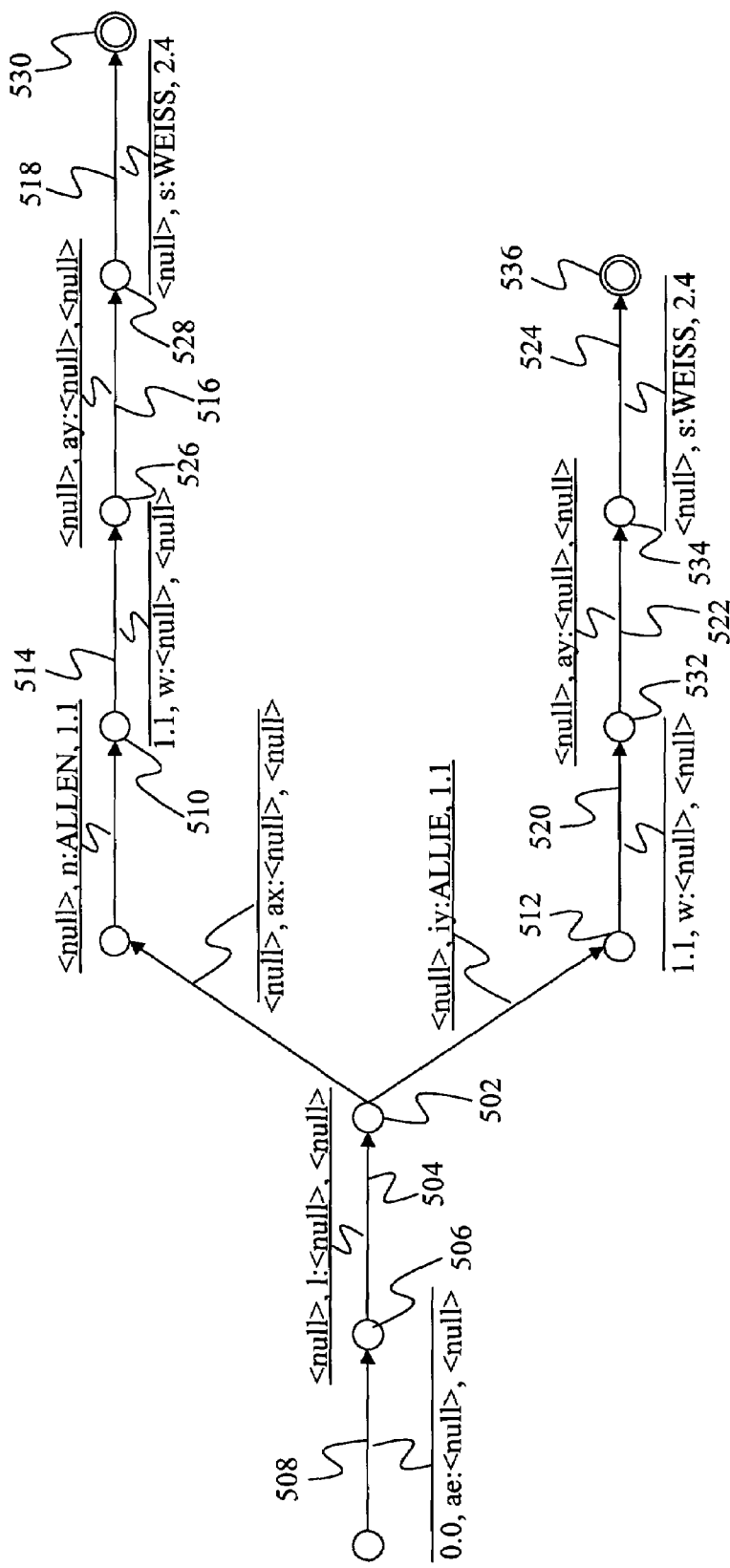
FIG. 5 is a diagram of a finite state machine after determinization.

The result of determinization during the optimization of step 310 is finite state machine 500 of FIG. 5. To form state machine 500, nodes 210 and 222 of FIG. 2 have been combined into a single node 502. Similarly, links 244 and 246 have been combined to form link 504, nodes 208 and 220 have been combined to form node 506 and links 240 and 242 have been combined to form link 508. Through the step of determinization, it can be seen that there is at most one link leaving each node with a given label.

Figure 6:
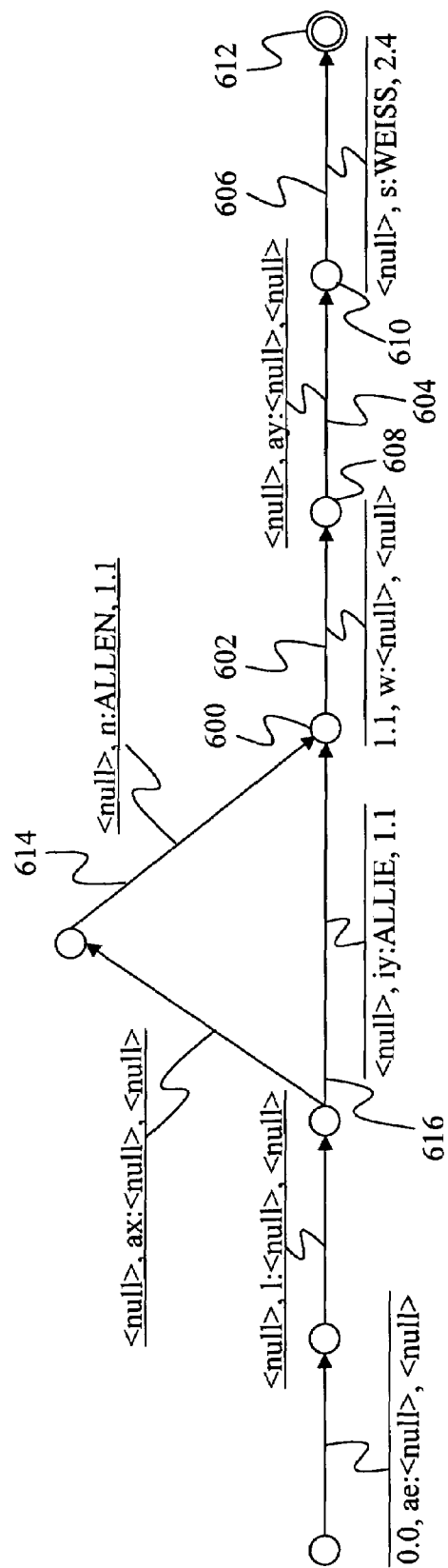
FIG. 6 is a diagram of a finite state machine after determinization and minimization.

State machine 500 is further optimized during optimization step 310 by minimizing the state machine. The results of such minimization are shown in FIG. 6 where nodes 510 and 512 of FIG. 5 have been combined into node 600. Similarly, links 514, 516, and 518 have been combined with links 520, 522, and 524, respectively, to form links 602, 604, and 606, and nodes 526, 528 and 530 have been combined with nodes 532, 534 and 536, respectively to form nodes 608, 610 and 612. Under one embodiment, the state machine of FIG. 6 is the fully optimized state machine produced by step 310 of FIG. 3.

At step 312, the optimization is verified by verifying that the suffixes of all incoming links to a node and the prefixes of all outgoing links of a node match. For example, in FIG. 6, the suffixes of links 614 and 616 into node 600 match the prefix, "1.1", of outgoing link 602. If the suffixes and prefixes match for all of the nodes in the optimized finite state machine, the optimization is verified. Those skilled in the art will notice that this step is optional, because if the determinization and minimization are correctly implemented, verification is guaranteed to succeed. At step 314, the common suffixes/prefixes for each node are deleted from the links labels and the respective node labels are set equal to the common suffixes/prefixes at step 316.

Figure 7:
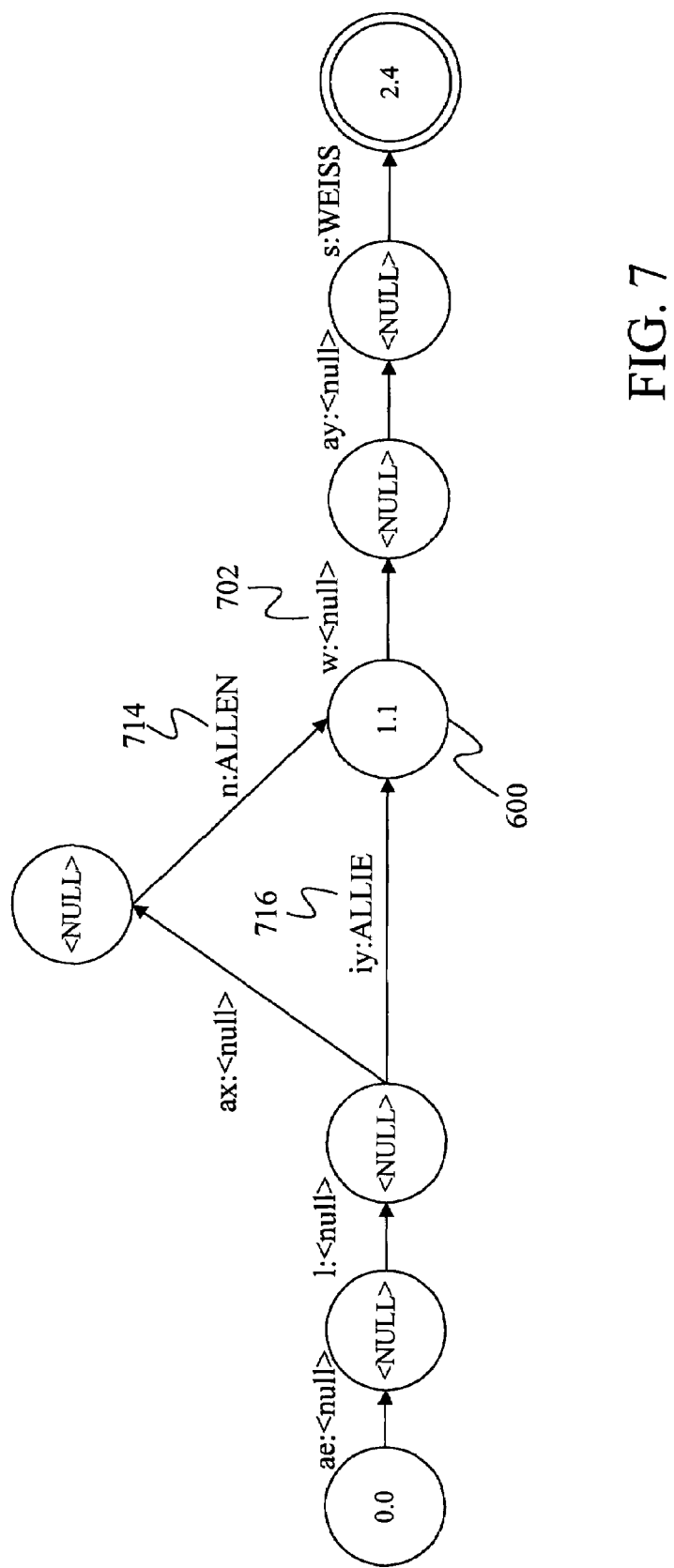
FIG. 7 is a diagram of an optimized finite state machine with the labels removed from the links and placed on the optimized nodes.

The results of steps 314 and 316 are shown in FIG. 7 where the node labels such as "1.1", "2.4" and "<null>" have been added to the nodes. For example, label "1.1" has been added to node 600 after being removed from the labels on links 614, 616, and 602 to form new link labels 714, 716, and 702. Thus FIG. 7 provides an optimized finite state machine with node labels.

By appending the node labels to the link labels before optimization, the present invention preserves the position of the node labels relative to the link labels while allowing the finite state machine to be minimized and determinized.

Although the present invention has been described with reference to particular embodiments, workers skilled in the art will recognize that changes may be made in form and detail without departing from the spirit and scope of the invention. In particular, although the present invention has been discussed with reference to finite state machines used in language processing, the techniques of the present invention may be used with finite state machines that are designed for other purposes. In addition, although finite state transducers have been discussed above, those skilled in the art will recognize that the invention can be used with finite state acceptors, which do not generate an output string from the input string. Further, such finite state acceptors can include probabilities on the links thus forming weighted finite state acceptors.

What is claimed is:

1. A computer-readable medium having computer-executable instructions for performing steps comprising:

defining a finite state machine that has a structure that includes nodes connected by links, wherein the nodes and the links are labeled;

adding a label from a node to respective labels of each link connected to the node, wherein adding a label from a node to a label for a link comprises inserting a separator between the label from the node and the label for the link to form a modified label for the link;

removing a label from a node that was added to a label for a link;

changing the structure of the finite state machine; and inserting a label on a node.

2. The computer-readable medium of claim 1 wherein adding a label from a node to a label of a link comprises appending the label from the node to the end of the label of the link if the link leads into the node.

3. The computer-readable medium of claim 1 wherein adding a label from a node to a label of a link comprises appending the label from the node to the beginning of the label of the link if the link leads out of the node.

4. The computer-readable medium of claim 1 wherein changing the structure of the finite state machine comprises removing a node from the finite state machine.

5. The computer-readable medium of claim 1 wherein inserting a label on a node comprises removing a portion of a label on a link connected to the node and inserting the removed portion of the label of the link as the label for the node.

6. The computer-readable medium of claim 5 wherein the portion removed from the label on the link is an ending portion of the label on the link if the link is an incoming link to the node.

7. The computer-readable medium of claim 5 wherein the portion removed from the label on the link is a beginning portion of the label on the link if the link is an outgoing link from the node.

* * * * *